US007898208B2

(12) United States Patent
Ochiai et al.

(10) Patent No.: US 7,898,208 B2
(45) Date of Patent: Mar. 1, 2011

(54) CONTROL DEVICE AND CORRESPONDING CONTROL METHOD FOR A BOOST CONVERTER IN A MOTOR DRIVE SYSTEM

(75) Inventors: Kiyoe Ochiai, Nagoya (JP); Masaki Okamura, Toyota (JP); Hiroyuki Oyanagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 397 days.

(21) Appl. No.: 12/085,445

(22) PCT Filed: Nov. 1, 2006

(86) PCT No.: PCT/JP2006/322328
§ 371 (c)(1),
(2), (4) Date: May 23, 2008

(87) PCT Pub. No.: WO2007/069413
PCT Pub. Date: Jun. 21, 2007

(65) Prior Publication Data
US 2009/0108794 A1    Apr. 30, 2009

(30) Foreign Application Priority Data
Dec. 16, 2005  (JP)  ................................ 2005-363688

(51) Int. Cl.
H02P 27/08 (2006.01)
(52) U.S. Cl. .................. 318/760; 318/727; 318/757; 318/759
(58) Field of Classification Search .................. 318/760, 318/759, 757, 727
See application file for complete search history.

(56) References Cited

U.S. PATENT DOCUMENTS 5,491,445 A * 2/1996 Moller et al. ............... 327/540

(Continued)

FOREIGN PATENT DOCUMENTS

EP    0 903 259 A2    3/1999

(Continued)

OTHER PUBLICATIONS

Gökdere L. et al., "A Virtual Prototype for a Hybrid Electric Vehicle," 2002, Mechatronics, vol. 12, pp. 575-593.

*Primary Examiner*—Walter Benson
*Assistant Examiner*—David S Luo
(74) *Attorney, Agent, or Firm*—Oliff & Berridge PLC

(57) ABSTRACT

A boost converter boosts a DC voltage of a DC power supply. An inverter converts the output voltage of the boost converter into an AC voltage. A control device that controls the boost converter reduces an output voltage instruction value of the boost converter when the rotation speed of the AC motor decreases and an absolute value of a variation rate of the rotation speed is not less than a predetermined value. The inverter is controlled in the control mode selected from a plurality of control modes including three modes of a sine wave PWM control mode, an overmodulation PWM control mode and a rectangular wave control mode. The control device of the boost converter reduces the output voltage instruction value of the boost converter only when the control mode of the inverter is the rectangular wave control mode or the overmodulation control mode.

10 Claims, 7 Drawing Sheets

U.S. PATENT DOCUMENTS 6,473,683 B1  10/2002  Nada
7,064,505 B2 *  6/2006  Sato ........................... 318/266

FOREIGN PATENT DOCUMENTS

| | | |
|---|---|---|
| JP | A 2000-358393 | 12/2000 |
| JP | A 2001-078497 | 3/2001 |
| JP | A 2001-295676 | 10/2001 |
| WO | WO 2005/013473 A1 | 2/2005 |

* cited by examiner

CONTROL DEVICE AND CORRESPONDING CONTROL METHOD FOR A BOOST CONVERTER IN A MOTOR DRIVE SYSTEM

TECHNICAL FIELD

The present invention relates to a control device of a boost converter which converts a direct-current (DC) voltage from a DC power supply into a target voltage and a control method of the boost converter.

BACKGROUND ART

Considerable attention has been recently focused on a hybrid vehicle and an electric vehicle as an environmentally friendly vehicle.

This hybrid vehicle uses, in addition to the conventional engine, a DC power supply, an inverter, and a motor driven by the inverter as a power source. That is, while the hybrid vehicle is powered by driving the engine, it is also powered by converting the DC voltage from the DC power supply into an alternating current (AC) voltage by the inverter and by using the converted AC voltage to rotate the motor. The electric vehicle also uses a DC power supply, an inverter, and a motor driven by the inverter as a power source.

Japanese Patent Laying-Open No. 2001-295676 discloses that, in a hybrid vehicle, an angular acceleration of the drive shaft is used to detect the slipping state and to limit the torque.

Immediately after a running vehicle runs on to a protrusion on the road surface, for example, a road shoulder, a fallen object, and the like, a slipping state is caused in which the tire spins. Since the road surface resistance is eliminated in the slipping state, the rotation speed of the wheel is increased if the wheel is rotated without changing the torque.

Since the output power is proportional to the torque×the rotation speed, the slipping state causes a lot of electric power to be consumed in the motor which drives the wheels. Accordingly, the control is performed such that more electric power may be supplied to the motor.

On the other hand, after the slipping state is over, the tire comes into contact with the road surface again to bring about a gripping state, in which the rotation speed of the tire is rapidly decreased due to friction with the road surface. The rotation speed of the motor also rapidly decreases with decrease in the rotation speed of the tire.

It is also contemplated that, in the hybrid vehicle and the like, the DC voltage from the power supply is boosted by a boost converter, and the boosted DC voltage is converted into an AC voltage by the inverter to drive the motor.

In such a configuration including the boost converter, when the rotation speed of the motor rapidly decreases, excessive electric power may be supplied from the boost converter to the inverter. Therefore, there is a need to lower the target voltage of the boost converter.

Japanese Patent Laying-Open No. 2001-295676 does not disclose the control of the boost converter performed in the case of such a change from the slipping state to the gripping state.

DISCLOSURE OF THE INVENTION

An object of the present invention is to provide a control device of a boost converter which is capable of immediately preventing an overvoltage, and a control method of the boost converter.

The present invention, in summary, provides a control device of a boost converter used in an electric motor drive system. The boost converter boosts a DC voltage of a DC power supply, and the electric motor drive system includes an inverter converting an output voltage of the boost converter into an AC voltage, and an electric motor driven by an output voltage of the inverter. The control device of the boost converter reduces an output voltage instruction value of the boost converter in the case where a rotation speed of the electric motor decreases and an absolute value of a variation rate of the rotation speed becomes not smaller than a predetermined value.

Preferably, the inverter is controlled in a control mode selected from a plurality of control modes including three modes of a sine wave PWM control mode, an overmodulation PWM control mode and a rectangular wave control mode. The control device of the boost converter reduces the output voltage instruction value of the boost converter only in the case where the control mode of the inverter is the rectangular wave control mode or the overmodulation control mode.

Preferably, the electric motor drive system further includes a power supply line transmitting the output voltage of the boost converter to the inverter, a capacitor connected to the power supply line, and a detection unit detecting the state of the capacitor. The control device of the boost converter reduces the output voltage instruction value of the boost converter at a reducing rate in accordance with an output of the detection unit.

Preferably, the electric motor drive system further includes a resolver detecting the rotation speed of the electric motor.

According to another aspect of the present invention, a control method of a boost converter used in an electric motor drive system is provided. The boost converter boosts a DC voltage of a DC power supply, and the electric motor drive system includes an inverter converting an output voltage of the boost converter into an AC voltage, and an electric motor driven by an output voltage of the inverter. The control method includes the steps of determining whether or not a variation amount of a rotation speed of the electric motor is not more than a predetermined value, and reducing an output voltage instruction value of the boost converter in the case where the rotation speed decreases and an absolute value of a variation rate of the rotation speed becomes not smaller than the predetermined value.

Preferably, the inverter is controlled in a control mode selected from a plurality of control modes including three modes of a sine wave PWM control mode, an overmodulation PWM control mode and a rectangular wave control mode. The control method further includes the step of reducing the output voltage instruction value of the boost converter only in the case where the control mode of the inverter is the rectangular wave control mode or the overmodulation control mode.

Preferably, the electric motor drive system further includes a power supply line transmitting the output voltage of the boost converter to the inverter, a capacitor connected to the power supply line, and a detection unit detecting the state of the capacitor. The control method further includes the step of reducing the output voltage instruction value of the boost converter at a reducing rate in accordance with an output of the detection unit.

Preferably, the electric motor drive system further includes a resolver detecting the rotation speed of the electric motor.

According to the present invention, an overvoltage of the inverter can be prevented adequately.

BEST MODES FOR CARRYING OUT THE INVENTION

Figure 1:
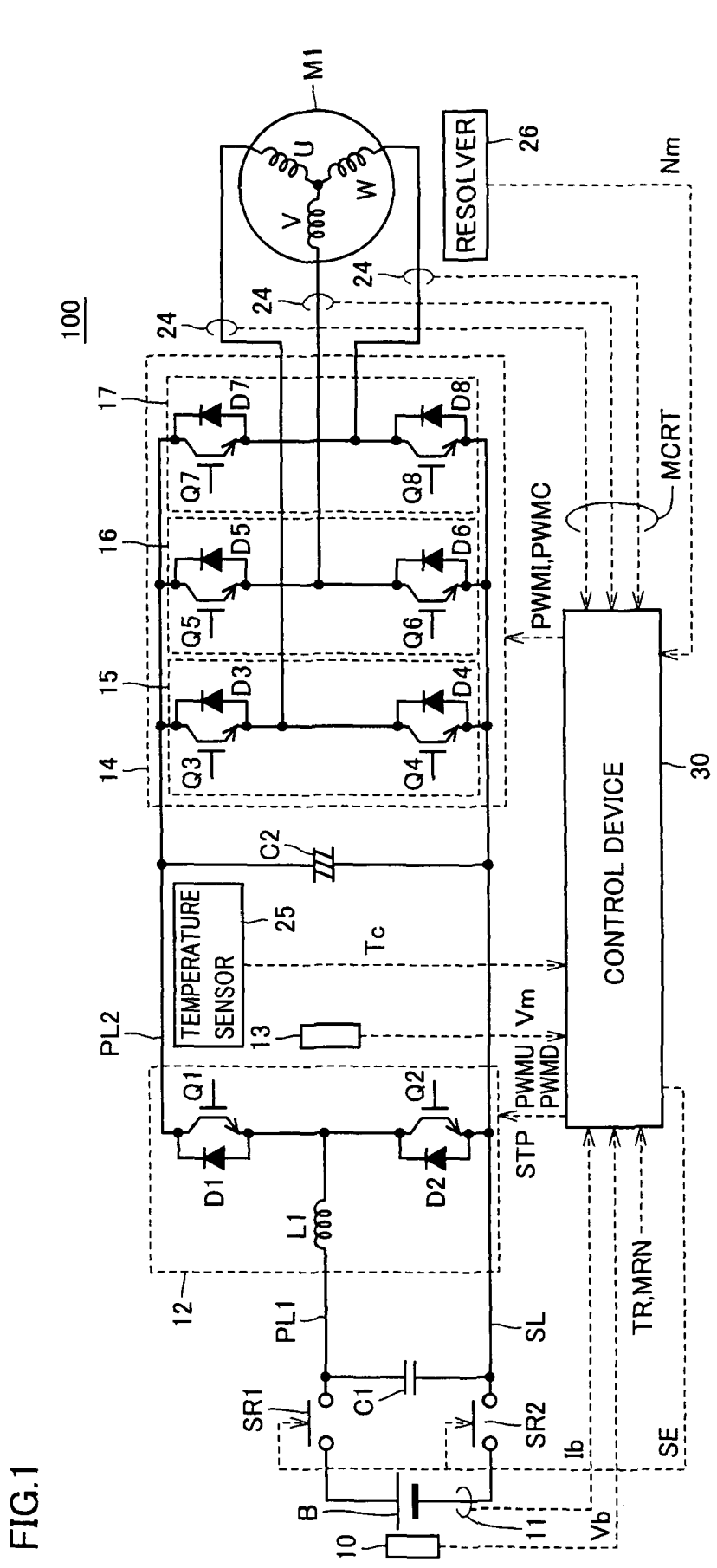
FIG. 1 is a circuit diagram of a motor drive device provided with a control device of a boost converter according to an embodiment of the present invention.

The embodiments of the present invention will be hereinafter described in detail with reference to the drawings, in which the same or corresponding components in each figure are designated by the same reference characters, and description thereof will not be repeated.

FIG. 1 is a circuit diagram of a motor drive device provided with a control device of a boost converter according to an embodiment of the present invention.

Referring to FIG. 1, a motor drive device 100 includes a DC power supply B, voltage sensors 10 and 13, system relays SR1 and SR2, capacitors C1 and C2, a boost converter 12, an inverter 14, current sensors 11 and 24, a temperature sensor 25, a resolver 26, and a control device 30. An AC motor M1 is a drive motor for generating a torque for driving a driving wheel of a hybrid vehicle or an electric vehicle. Alternatively, this motor may be incorporated in the hybrid vehicle such that it can function as a generator driven by the engine, and that it can operate as an electric motor for the engine, for example, to start the engine.

Boost converter 12 includes a reactor L1, NPN transistors Q1 and Q2, and diodes D1 and D2. Reactor L1 has one end connected to a power supply line PL1 of DC power supply B, and has the other end connected to an intermediate point between NPN transistor Q1 and NPN transistor Q2, that is, between an emitter of NPN transistor Q1 and a collector of NPN transistor Q2. NPN transistors Q1 and Q2 are connected in series between a power supply line PL2 and a ground line SL. The collector of NPN transistor Q1 is connected to power supply line PL2, and the emitter of NPN transistor Q2 is connected to ground line SL. Moreover, diodes D1 and D2 are arranged between the collector and the emitter of each of NPN transistors Q1 and Q2, respectively, to supply current from the emitter side to the collector side.

Inverter 14 includes a U-phase arm 15, a V-phase arm 16 and a W-phase arm 17. U-phase arm 15, V-phase arm 16 and W-phase arm 17 are provided in parallel between power supply line PL2 and ground line SL.

U-phase arm 15 includes NPN transistors Q3 and Q4 connected in series. V-phase arm 16 includes NPN transistors Q5 and Q6 connected in series. W-phase arm 17 includes NPN transistors Q7 and Q8 connected in series. Furthermore, diodes D3 to D8 are connected between the collector and the emitter of each of NPN transistors Q3 to Q8, respectively, to supply current from the emitter side to the collector side.

The intermediate point of each phase arm is connected to each phase end of each phase coil of AC motor M1. That is, AC motor M1 is a 3-phase permanent magnet motor, in which three coils of the U-, V- and W-phases each have one end connected in common to a neutral point. The other end of the U-phase coil is connected to an intermediate point between NPN transistors Q3 and Q4, the other end of the V-phase coil is connected to an intermediate point between NPN transistors Q5 and Q6, and the other end of the W-phase coil is connected to an intermediate point between NPN transistors Q7 and Q8. Resolver 26 detects a rotation speed Nm of AC motor M1, and transmits the detected rotation speed Nm to control device 30.

It is to be noted that NPN transistors Q1 to Q8 and the like can be replaced with other power switching elements which may be, for example, an IGBT (insulated gate bipolar transistor) and a power MOSFET.

DC power supply B includes a secondary battery such as a nickel hydrogen battery or a lithium-ion battery. Voltage sensor 10 detects a DC voltage Vb output from DC power supply B, and outputs the detected DC voltage Vb to control device 30. Current sensor 11 detects a DC current Ib output from DC power supply B, and outputs the detected DC current Ib to control device 30. System relays SR1 and SR2 are turned on/off by a signal SE from control device 30.

Capacitor C1 smoothes the DC voltage supplied from DC power supply B, and supplies the smoothed DC voltage to boost converter 12.

Boost converter 12 boosts the DC voltage supplied from capacitor C1 and supplies it to capacitor C2. More specifically, when boost converter 12 receives a signal PWMU from control device 30, it boosts the DC voltage in accordance with a period during which NPN transistor Q2 is turned on by signal PWMU, and supplies it to capacitor C2. In this case, NPN transistor Q1 is turned off by signal PWMU. Furthermore, when boost converter 12 receives a signal PWMD from control device 30, it lowers the DC voltage supplied from inverter 14 via capacitor C2, to charge DC power supply B.

Capacitor C2 smoothes the DC voltage from boost converter 12, and supplies the smoothed DC voltage to inverter 14. Voltage sensor 13 detects the voltage of each end of capacitor C2, that is, an output voltage Vm of boost converter 12 (corresponding to an input voltage to inverter 14, which is the same in the following), and outputs the detected output voltage Vm to control device 30.

Temperature sensor 25 detects a temperature Tc of capacitor C2, and outputs it to control device 30. This temperature Tc is a parameter related to the capacitance variation of capacitor C2. Temperature sensor 25 does not have to directly detect the temperature of capacitor C2. For example, it may detect the temperature related to that of capacitor C2 such as the temperature of the coolant that cools inverter 14, and, based on this, control device 30 may estimate temperature Tc of capacitor C2.

When receiving the DC voltage from capacitor C2, inverter 14 converts the DC voltage into an AC voltage based on a signal PWMI from control device 30, to drive AC motor M1. This causes AC motor M1 to be driven so as to produce torque specified by a torque instruction value TR. In addition, during regenerative braking of the hybrid vehicle or electric vehicle incorporating motor drive device 100, inverter 14 converts the AC voltage generated by AC motor M1 into a DC voltage based on a signal PWMC from control device 30, and supplies the converted DC voltage to boost converter 12 via capacitor C2.

It is to be noted that the regenerative braking used herein includes braking involving regeneration when a foot brake operation is performed by a driver of the hybrid vehicle or electric vehicle, or deceleration (or stopping of acceleration) of the vehicle with regeneration by releasing an accelerator pedal during driving rather than by the operation of the foot brake.

Current sensor 24 detects a motor current MCRT flowing through AC motor M1, and outputs the detected motor current MCRT to control device 30.

Based on torque instruction value TR and a motor rotation speed MRN input from an external ECU (Electronic Control Unit), DC voltage Vb from voltage sensor 10, output voltage Vm from voltage sensor 13, and motor current MCRT from current sensor 24, control device 30 generates signal PWMU for driving boost converter 12 and signal PWMI for driving inverter 14, and outputs the generated signals PWMU and PWMI to boost converter 12 and inverter 14, respectively.

Signal PWMU functions to drive boost converter 12 in the case where boost converter 12 converts the DC voltage from capacitor C1 into output voltage Vm. In the case where boost converter 12 converts the DC voltage into output voltage Vm, control device 30 performs feedback control over output voltage Vm, in which it generates signal PWMU for driving boost converter 12 such that output voltage Vm may become a voltage instruction Vdc_com.

When control device 30 receives the signal from the external ECU indicating that the hybrid vehicle or electric vehicle has entered a regenerative braking mode, it generates signal PWMC for converting the AC voltage generated by AC motor M1 into a DC voltage, and outputs it to inverter 14. In this case, the switching of NPN transistors Q3-Q8 of inverter 14 is controlled by signal PWMC. Thus, inverter 14 converts the AC voltage generated by AC motor M1 into a DC voltage, and supplies it to boost converter 12.

Furthermore, when control device 30 receives the signal from the external ECU indicating that the hybrid vehicle or electric vehicle has entered a regenerative braking mode, it generates signal PWMD for lowering the DC voltage supplied from inverter 14, and outputs the generated signal PWMD to boost converter 12. This causes the AC voltage generated by AC motor M1 to be converted into a DC voltage, which is then supplied to DC power supply B.

Furthermore, control device 30 generates signal SE for turning on/off system relays SR1 and SR2, and outputs it to system relays SR1 and SR2.

Figure 2:
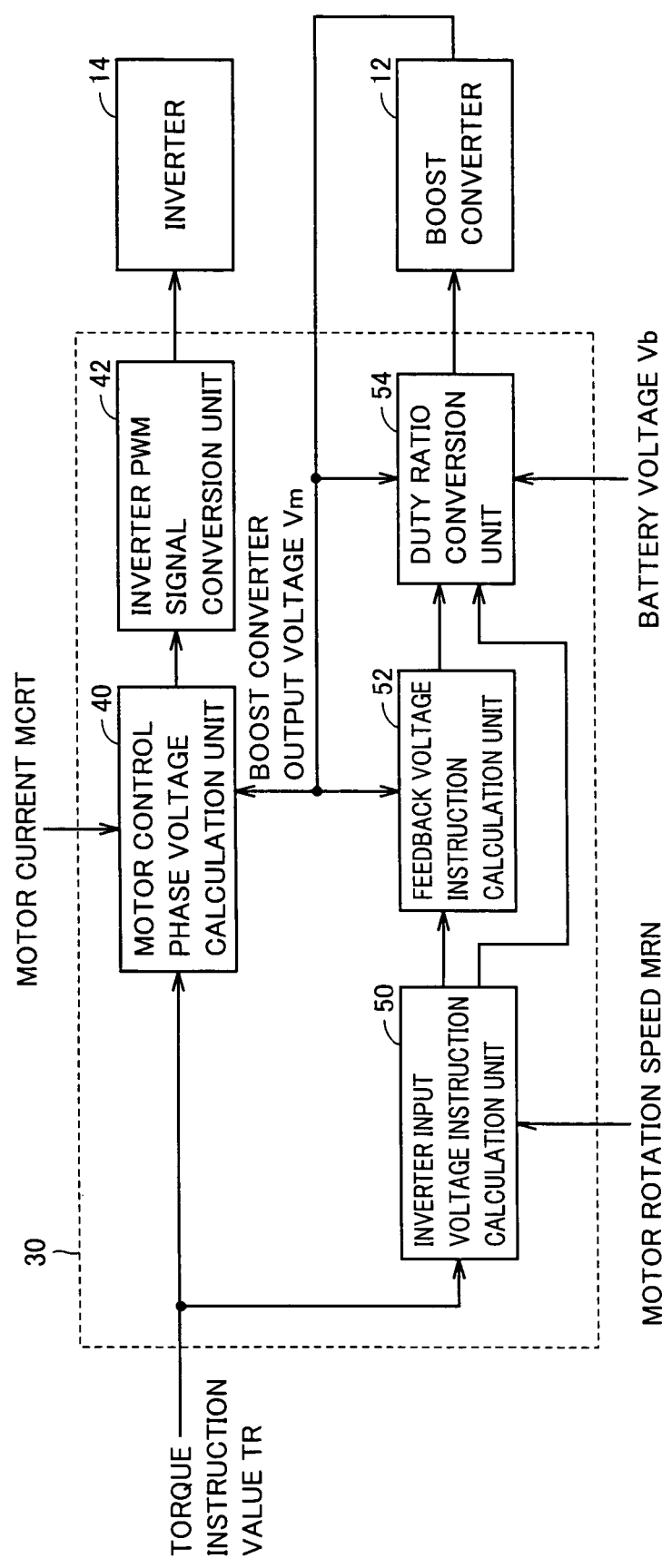
FIG. 2 is a functional block diagram of a control device 30.

FIG. 2 is a functional block diagram of control device 30.

Referring to FIG. 2, control device 30 includes a motor control phase voltage calculation unit 40, an inverter PWM signal conversion unit 42, an inverter input voltage instruction calculation unit 50, a feedback voltage instruction calculation unit 52, and a duty ratio conversion unit 54.

Motor control phase voltage calculation unit 40 receives output voltage Vm of boost converter 12, that is, the input voltage to inverter 14, from voltage sensor 13, receives motor current MCRT from current sensor 24 which flows through each phase of AC motor M1, and receives torque instruction value TR from the external ECU. Motor control phase voltage calculation unit 40 calculates the voltage to be applied to the coil of each phase of AC motor M1 based on these input signals, and supplies the calculated result to inverter PWM signal conversion unit 42. Based on the calculated result received from motor control phase voltage calculation unit 40, inverter PWM signal conversion unit 42 generates signals PWMI and PWMC which actually turn on/off each of NPN transistors Q3-Q8 of inverter 14, and outputs the generated signals PWMI and PWMC to each of NPN transistors Q3-Q8 of inverter 14.

Thus, each of NPN transistors Q3-Q8 has its switching controlled, and controls the current supplied to each phase of AC motor M1 such that AC motor M1 outputs the specified torque. In this way, the motor drive current is controlled, and the motor torque in accordance with torque instruction value TR is output.

On the other hand, inverter input voltage instruction calculation unit 50 calculates an optimal value (target value) of the inverter input voltage, that is, voltage instruction Vdc_com, based on torque instruction value TR and motor rotation speed MRN, and outputs the calculated voltage instruction Vdc_com to feedback voltage instruction calculation unit 52.

Based on output voltage Vm of boost converter 12 from voltage sensor 13 and voltage instruction Vdc_com from inverter input voltage instruction calculation unit 50, feedback voltage instruction calculation unit 52 calculates a feedback voltage instruction Vdc_com_fb according to the method as will be described below, and outputs the calculated feedback voltage instruction Vdc_com_fb to duty ratio conversion unit 54.

Duty ratio conversion unit 54 calculates a duty ratio for setting output voltage Vm from voltage sensor 13 to feedback voltage instruction Vdc_com_fb based on DC voltage Vb from voltage sensor 10 and feedback voltage instruction Vdc_com_fb from feedback voltage instruction calculation unit 52, and generates signals PWMU and PWMD for turning on/off NPN transistors Q1 and Q2 of boost converter 12 based on the calculated duty ratio. Duty ratio conversion unit 54 outputs the generated signals PWMU and PWMD to NPN transistors Q1 and Q2 of boost converter 12.

The increased on-duty of NPN transistor Q2 of boost converter 12 on the side of ground line SL causes much electric power to be stored in reactor L1, and therefore, the output of higher voltage can be achieved. On the other hand, the increased on-duty of NPN transistor Q1 on the side of power supply line PL2 causes the voltage on power supply line PL2 to be lowered. Consequently, controlling the duty ratios of NPN transistors Q1 and Q2 allows the voltage between power supply lines PL1 and PL2 to be controlled to be an arbitrary positive voltage.

Figure 3:
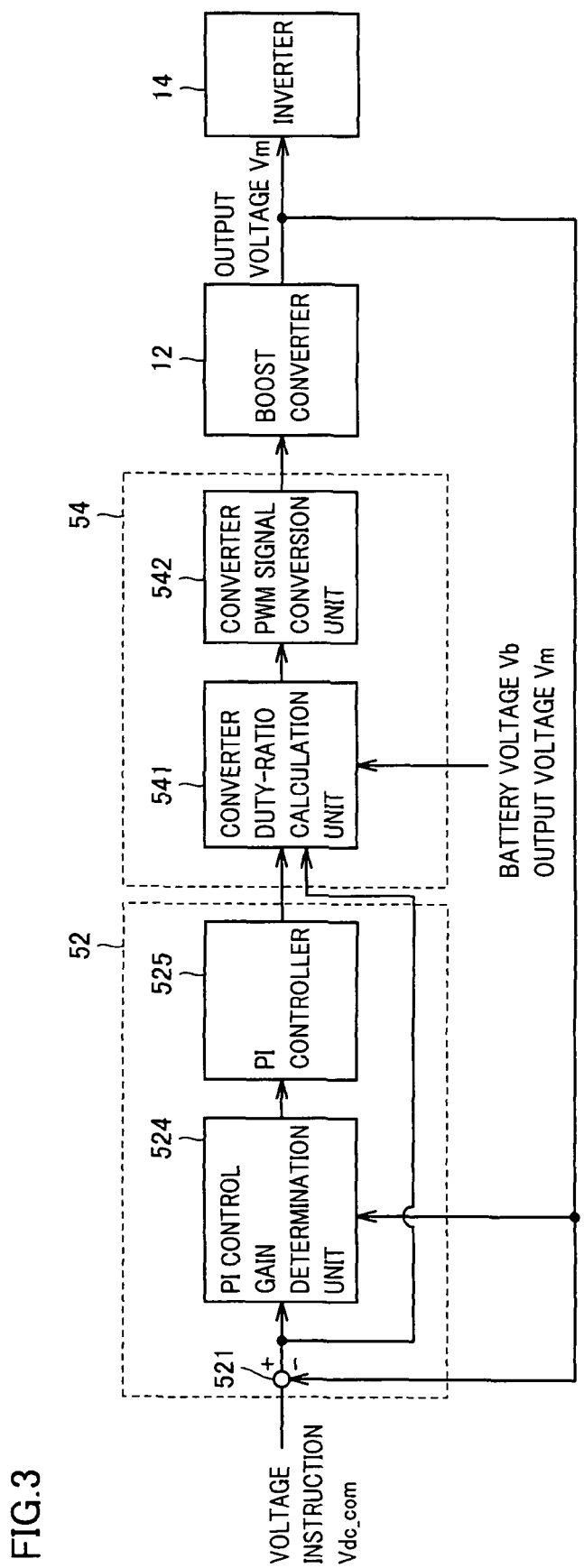
FIG. 3 is a functional block diagram of a feedback voltage instruction calculation unit 52 and a duty ratio conversion unit 54 shown in FIG. 2.

FIG. 3 is a functional block diagram of feedback voltage instruction calculation unit 52 and duty ratio conversion unit 54 shown in FIG. 2.

Referring to FIG. 3, feedback voltage instruction calculation unit 52 includes a subtractor 521, a PI (proportional-plus-integral) control gain determination unit 524, and a PI controller 525.

Subtractor 521 receives voltage instruction Vdc_com from inverter input voltage instruction calculation unit 50 and output voltage Vm from voltage sensor 13, and subtracts output voltage Vm from voltage instruction Vdc_com. Subtractor 521 then outputs the subtraction result as a deviation ΔVdc to PI control gain determination unit 524, and also outputs target voltage instruction Vdc_com to PI control gain determination unit 524.

PI control gain determination unit 524 outputs a proportional gain Kp and an integral gain Ki to PI controller 525, together with voltage instruction Vdc_com and deviation ΔVdc.

PI controller 525 calculates feedback voltage instruction Vdc_com_fb based on proportional gain Kp, integral gain Ki and deviation ΔVdc received from PI control gain determination unit 524. Specifically, PI controller 525 substitutes proportional gain Kp, integral gain Ki and deviation ΔVdc received from PI control gain determination unit 524 into the following expression, to calculate feedback voltage instruction Vdc_com_fb.

$$Vdc\_com\_fb = Kp \times \Delta Vdc + Ki \times \Sigma \Delta Vdc \quad (1)$$

PI controller 525 then outputs the calculated feedback voltage instruction Vdc_com_fb to duty ratio conversion unit 54.

Duty ratio conversion unit 54 includes a converter duty-ratio calculation unit 541 and a converter PWM signal conversion unit 542. Converter duty-ratio calculation unit 541 calculates the duty ratio for causing output voltage Vm from voltage sensor 13 to conform to a value of feedback voltage instruction Vdc_com_fb, based on DC voltage Vb from voltage sensor 10 and feedback voltage instruction Vdc_com_fb from PI controller 525.

Converter PWM signal conversion unit 542 generates signals PWMU and PWMD for turning on/off NPN transistors Q1 and Q2 of boost converter 12, based on the duty ratio from converter duty-ratio calculation unit 541. Converter PWM signal conversion unit 542 then outputs the generated signals PWMU and PWMD to NPN transistors Q1 and Q2 of boost converter 12.

NPN transistors Q1 and Q2 of boost converter 12 are turned on/off based on signal PWMU. Thus, boost converter 12 converts the DC voltage into output voltage Vm such that output voltage Vm may become voltage instruction Vdc_corn.

Figure 4:
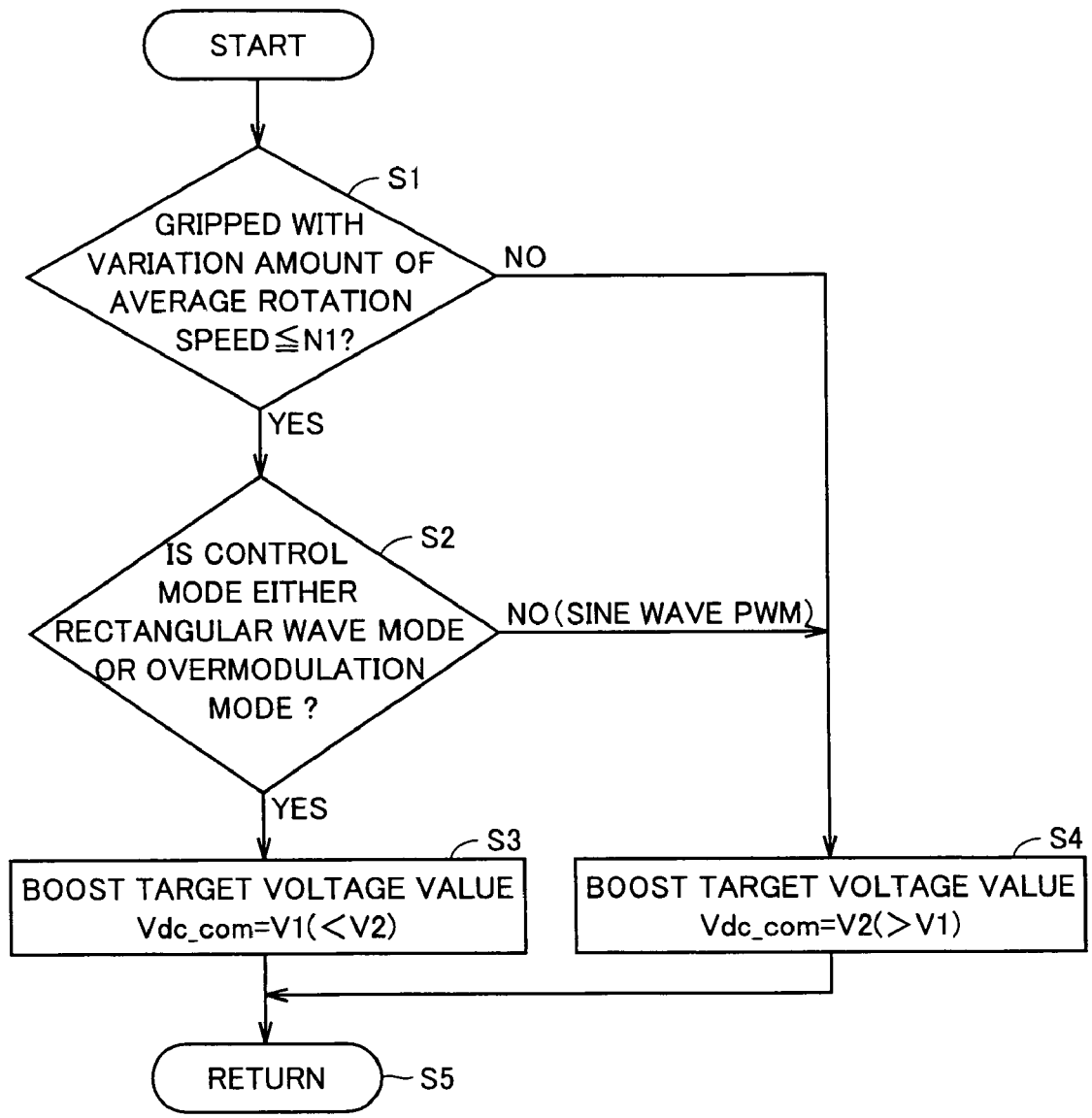
FIG. 4 is a flow chart for illustrating switching control of a target voltage value performed by control device 30.

FIG. 4 is a flow chart for illustrating switching control of a target voltage value performed by control device 30. The process of this flow chart is performed as it is called from a predetermined main routine at regular intervals or every time predetermined conditions are satisfied. Control device 30 carries out this process as inverter input voltage instruction calculation unit 50 shown in FIG. 2.

Referring to FIGS. 1 and 4, when the process is first started, in step S1, control device 30 receives the output of resolver 26, calculates an average rotation speed during X (ms) of rotation speed Nm of AC motor M1, and monitors its change. Control device 30 then determines whether or not the variation amount of the average rotation speed is not more than a predetermined value N1. If the variation amount of the average rotation speed is not more than predetermined value N1, that is, when the rotation speed is rapidly decreased, control device 30 determines that the state of the wheel has changed from the slipping state to the gripping state (YES in step S1).

If the variation amount of average rotation speed ≦N1 is satisfied in step S1, the process proceeds to step S2, and if not, the process proceeds to step S4.

In step S2, it is determined whether the control mode of AC motor M1 is one of a rectangular wave control mode and an overmodulation PWM control mode.

The control mode of AC motor M1 will now be described. Control device 30 performs the control over inverter 14, by switching among three control modes, that is, a rectangular wave control mode, an overmodulation PWM (Pulse Width Modulation) control mode, and a sine wave PWM control mode.

With the sine wave PWM control, an effective value of a fundamental wave component of a voltage waveform, that is, the modulation rate, falls within the range between 0 and 0.61, and the pulse voltage or current generated by pulse width modulation of the fundamental wave with a carrier wave is supplied to the motor. In the case of the PWM current control in which a PWM waveform voltage is applied to an AC electric motor, smooth rotation can be achieved even in a low rotation region. There however is a problem of a limited voltage utilization ratio of the DC power supply.

On the other hand, there is also a method of applying a rectangular wave voltage to the AC electric motor for the drive control thereof. In this rectangular wave control method, the rectangular wave synchronized with the fundamental wave is applied. The rectangular wave control method allows the voltage utilization ratio of the DC power supply to be improved to the modulation rate of about 0.78, and consequently, the output in a high rotation region to be improved. Since the field weakening current can be decreased, the copper loss can be suppressed to improve the energy efficiency. Furthermore, there is also an advantage that switching loss can be suppressed since the number of switching in the inverter can be reduced. The switching period however is long, and therefore, smooth rotation cannot be achieved in the low rotation region, and it is not possible to follow the abrupt change of the rotation speed.

Overmodulation PWM control is also performed as an intermediate control between the sine wave PWM control and the rectangular wave control. In the case of the overmodulation PWM control, the modulation rate falls within the range of 0.61 to 0.78. With the overmodulation PWM control, the duty ratios of individual pulses of the sine wave PWM control are made greater on the peak side of the fundamental wave component and smaller on the valley side thereof than in the case of the sine wave PWM control.

Accordingly, inverter 14 has a configuration capable of performing any of the PWM control, the overmodulation control and the rectangular wave control on the AC electric motor. Control device 30 uses them appropriately depending on the situation, and performs the control to improve the output of the electric motor especially in the high rotation region.

The sine wave PWM control mode of high switching frequency is advantageous in addressing an abrupt change of the motor rotation speed. In the case of the rectangular wave control or the overmodulation PWM control in which the switching period is long, it may not be able to follow the abrupt change of the motor rotation speed.

Therefore, in step S2, control device 30 changes the subsequent process depending on which control mode is used to control AC motor M1.

In the case where it is determined in step S2 that the control mode is either the rectangular wave control mode or the overmodulation PWM control mode, the process of step S3 is carried out. In step S3, voltage instruction value Vdc_com which is a boost target voltage value is set to a predetermined value V1.

On the other hand, in the case where it is determined in step S2 that the control mode is neither the rectangular wave control mode nor the overmodulation PWM control mode, the control mode is the sine wave PWM control mode capable of properly following the abrupt change, and the process of step S4 is carried out. In step S4, voltage instruction value Vdc_com which is a boost target voltage value is set to a predetermined value V2. It is to be noted that predetermined value V1 is a value smaller than predetermined value V2. For example, V1=550V and V2=600V.

When the process of step S3 or S4 is completed, the control is transferred to the main routine in step S5.

Figure 5:
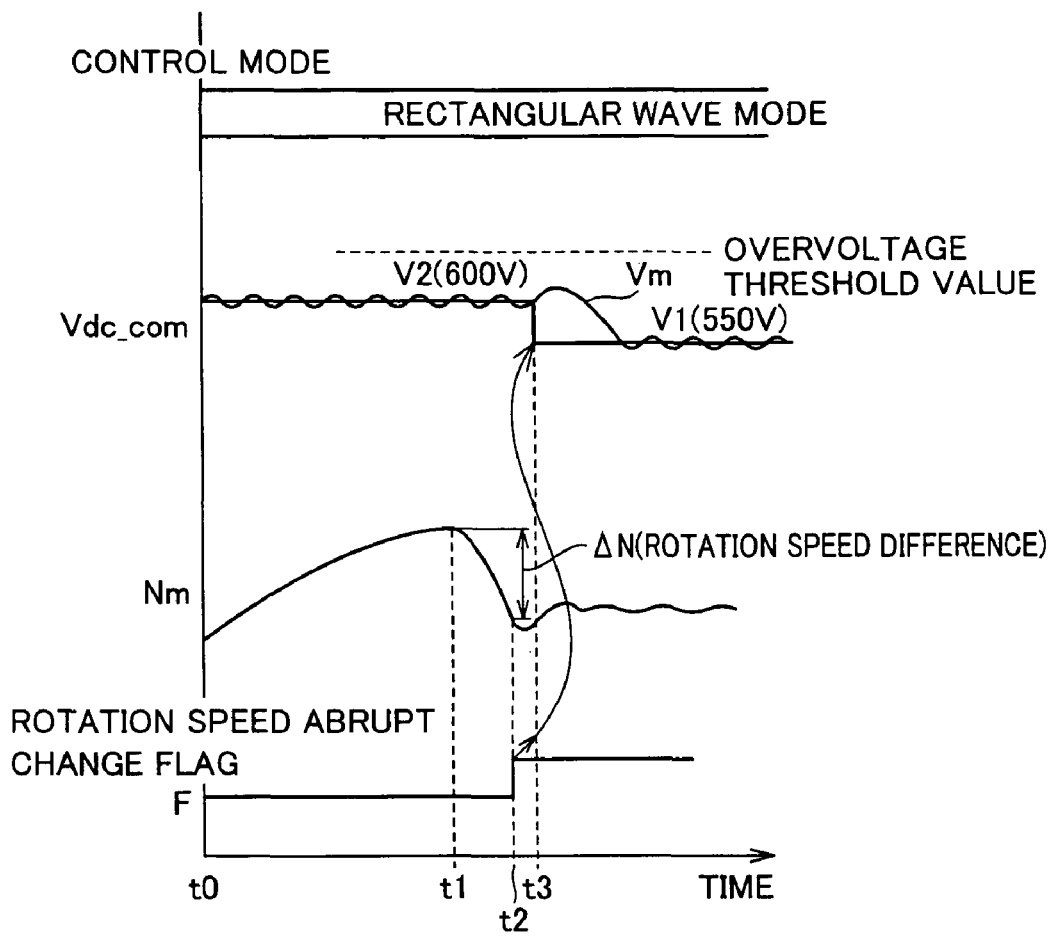
FIG. 5 is an operation waveform diagram for illustrating the operation of a boost converter control device according to the present embodiment.

FIG. 5 is an operation waveform diagram for illustrating the operation of a boost converter control device according to the present embodiment.

Referring to FIG. 5, the control mode of motor M1 is initially the rectangular wave control mode, and voltage instruction value Vdc_com which is a boost target value is set to 600V at time t0. If the wheel is shifted from the slipping state to the gripping state during the rectangular wave control mode or the overmodulation PWM control mode, poor following capability of the current tends to cause fluctuations in the current and disturbances in the power balance.

During the period from time t0 to time t1, rotation speed Nm of AC motor M1 is increased due to, for example, the slipping state in which the wheel runs on a step and spins. During the period from time t0 to time t1, the electric power supplied to inverter 14 from boost converter 12 or a generator which is not shown is increased, and motor voltage Vm is controlled to be in the vicinity of target boost value Vdc_com by the rectangular wave control.

At time t1, the wheel coming into contact with the road surface, and the like, changes to the gripping state. The rotation speed of AC motor M1 is rapidly decreased during the period from time t1 to time t2.

Control device 30 monitors the output of resolver 26 at regular intervals, to thereby determine that the wheel has attained the gripping state based on the fact that a rotation speed difference ΔN becomes smaller than predetermined value N1 which is a negative value (i.e., that the rotation speed is rapidly decreased), and then activates a rotation speed abrupt change flag F. Control device 30 reduces voltage instruction value Vdc_com from 600V to 550V in response to the activation of flag F.

The gripping state during the period from time t1 to time t2 after the slipping state causes excessive electric power supplied from boost converter 12 or the generator which is not shown to the inverter of a motor M2, and also causes an overshoot of motor voltage Vm. Target voltage instruction value Vdc_com is then reduced corresponding to this timing, and therefore, it becomes possible to perform the control over an overvoltage threshold value adequately such that motor voltage Vm may not reach the overvoltage threshold value. It is also possible to prevent motor voltage Vm from being an overvoltage without the need to switch the control mode to the sine wave PWM mode ensuring good following capability.

Further, the gripping state is detected, not by detecting that there is an excess of electric power, but by directly detecting the rapid decrease in the rotation speed of the motor which is the cause of such excessive electric power. Therefore, the timing at which boost target value Vdc_com is reduced can be advanced, to thereby allow the adequate control over the overvoltage threshold value to be performed accordingly.

[Example of Control Taking Account of Capacitor State]

Figure 6:
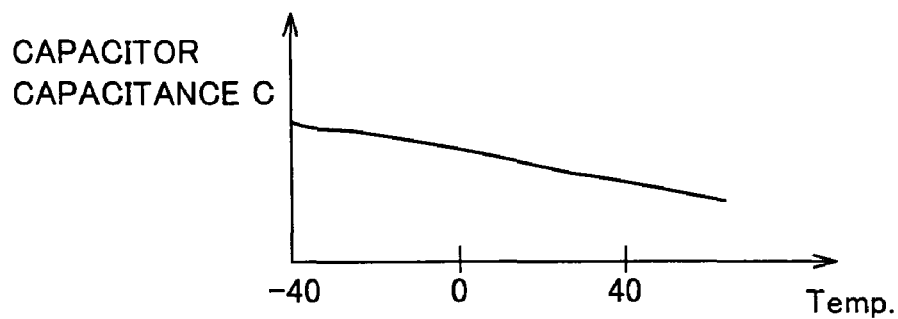
FIG. 6 is a diagram showing an example of the relation between a capacitor capacitance C and temperature.

FIG. 6 is a diagram showing an example of the relation between a capacitor capacitance C and temperature.

Capacitor capacitance C has a temperature dependence, including the cases that the capacitance decreases with an increase in temperature, and vice versa, as shown in FIG. 6. The property varies depending on the type of capacitor.

As shown in FIG. 5, in the case where boost target voltage instruction value Vdc_com is switched from V2 (for example, 600V) to V1 (for example, 550V), if the instruction value is rapidly reduced, a difference ΔE of the energy charged into capacitor C2 (a capacitance value is assumed to be C2) is returned to the side of DC power supply B. This ΔE is expressed by the following expression.

$$\Delta E = \frac{1}{2} \times C2 \times V2^2 - \frac{1}{2} \times C2 \times V1^2 \quad (2)$$

If this ΔE per unit time is large, the current of the boost converter may be increased to cause an overcurrent. Accordingly, the element of the boost converter having a sufficient withstand voltage should be used.

In order to prevent occurrence of an overcurrent in the boost converter, it is preferable to reduce the change amount of the voltage instruction value per unit time when capacitance value C2 is large, to gradually switch between the target instruction values.

Therefore, it is examined in advance how the capacitance of capacitor C2 changes relative to temperature, and a switching step voltage ΔV of the target instruction value per unit time is set in advance relative to the capacitor temperature such that the ΔE per unit time may be constant. By reducing the voltage instruction value at the reducing rate in light of the capacitor state in this way, occurrence of an overcurrent in the boost converter can be prevented.

Figure 7:
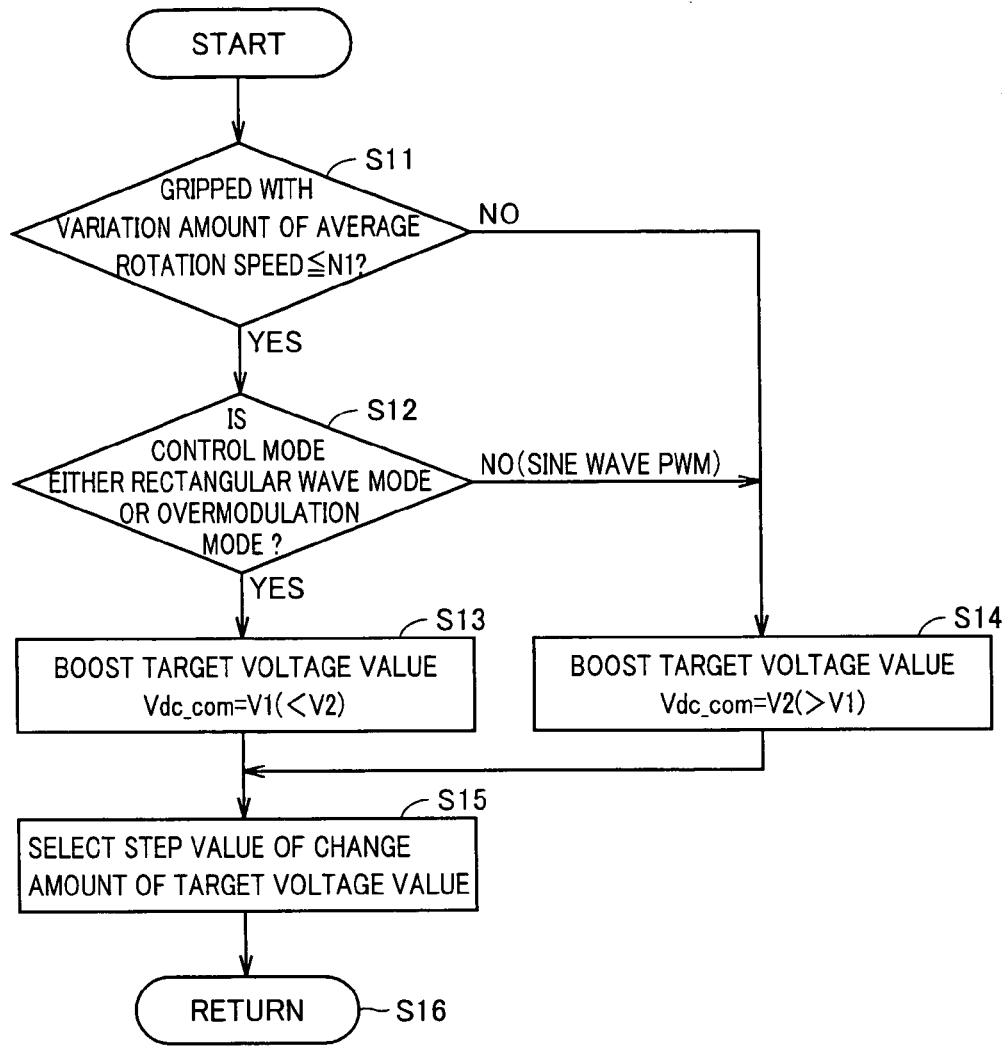
FIG. 7 is a flow chart for illustrating switching control of a voltage instruction value in light of a capacitor state.

FIG. 7 is a flow chart for illustrating switching control of the voltage instruction value in light of the capacitor state. The process of this flow chart is performed as it is called from the predetermined main routine at regular intervals or every time the predetermined conditions are satisfied. Control device 30 carries out this process as inverter input voltage instruction calculation unit 50 shown in FIG. 2.

Referring to FIGS. 1 and 7, when the process is first started, in step S11, control device 30 receives the output of resolver 26, calculates the average rotation speed during X (ms) of rotation speed Nm of AC motor M1, and monitors its change. Control device 30 then determines whether or not the variation amount of the average rotation speed is not more than predetermined value N1. Since a rapid decrease in the rotation speed is detected, N1 takes a predetermined negative value. If the variation amount of the average rotation speed is not more than predetermined value N1, that is, when the rotation speed is rapidly decreased, control device 30 determines that the state of the wheel has changed from the slipping state to the gripping state (YES in step S11). In other words, in the case where the rotation speed of AC motor M1 is reduced and an absolute value of a variation rate of the rotation speed is not less than the predetermined value (in the case where|variation amount of average rotation speed|≧N1), control device 30 determines that the state of the wheel has changed from the slipping state to the gripping state (YES in step S11).

If the variation amount of the average rotation speed≦N1 is satisfied in step S11, the process proceeds to step S12, and if not, the process proceeds to step S14.

In step S12, it is determined whether the control mode of AC motor M1 is one of the rectangular wave control mode and the overmodulation PWM control mode.

In the case where it is determined in step S12 that the control mode is either the rectangular wave control mode or the overmodulation PWM control mode, the process of step S13 is carried out. In step S13, a final target value of voltage instruction value Vdc_com which is a boost target voltage value is set to predetermined value V1.

That is, boost converter 12 boosts the DC voltage of DC power supply B. Inverter 14 converts the output voltage of the boost converter into an AC voltage. AC motor M1 is driven by the output voltage of inverter 14. Control device 30 which controls boost converter 12 reduces the output voltage instruction value of boost converter 12 in the case where the rotation speed of AC motor M1 is decreased and the absolute value of the variation rate of the rotation speed is not less than the predetermined value (YES in step S11 in FIG. 7).

In this case, inverter 14 is controlled in the control mode selected from a plurality of control modes including three modes of a sine wave PWM control mode, an overmodulation PWM control mode and a rectangular wave control mode. Control device 30 of the boost converter reduces the output voltage instruction value of boost converter 12 only in the case where the control mode of inverter 14 is either the rectangular wave control mode or the overmodulation control mode (YES in S12 in FIG. 7).

On the other hand, in the case where it is determined in step S12 that the control mode is neither the rectangular wave control mode nor the overmodulation PWM control mode, the control mode is the sine wave PWM control mode capable of properly following the abrupt change, and the process of step S14 is carried out. In step S14, voltage instruction value Vdc_com which is a boost target voltage value is set to predetermined value V2. It is to be noted that predetermined value V1 is a value smaller than predetermined value V2. For example, V1=550V and V2=600V.

When the process of step S13 or S14 is completed, the process of step S15 is carried out. In step S15, a step value of the change amount of the target voltage value per unit time is selected.

Figure 8:
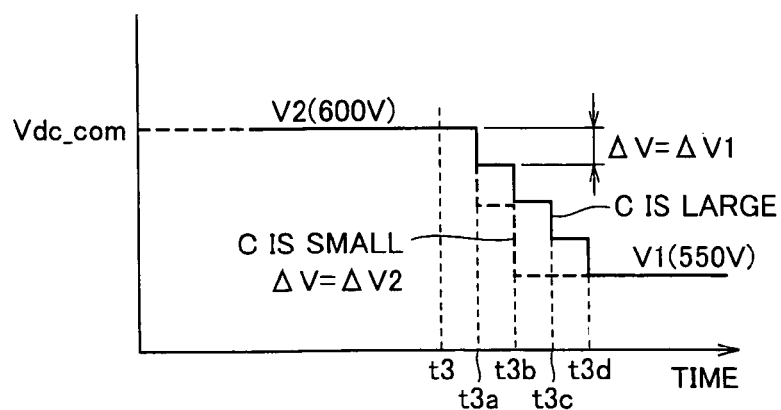
FIG. 8 is an operation waveform diagram for illustrating a step value of a change amount of a target voltage value per unit time.

FIG. 8 is an operation waveform diagram for illustrating the step value of the change amount of the target voltage value per unit time. The waveform diagram of FIG. 8 shows the enlarged switching part of boost target voltage value Vdc_com at time t3 in FIG. 5. Since the area around the part shown in FIG. 8 is similar to that in FIG. 5, description thereof will not be repeated.

Referring to FIG. 8, for example, if capacitor capacitance C is large, ΔE expressed by the expression (2) becomes large. Therefore, step amount ΔV per unit time is set to ΔV1, and target voltage value Vdc_com is reduced in a stepwise manner over the period from time t3a to time t3d. Conversely, if capacitor capacitance C is small, ΔE becomes small. Therefore, step amount ΔV is set to ΔV2, and target voltage value Vdc_com is reduced in a stepwise manner over the period from time t3a to time t3b.

As described above, the electric motor drive system shown in FIG. 1 includes power supply line PL2 transmitting the output voltage of boost converter 12 to inverter 14, capacitor C2 connected to power supply line PL2, and temperature sensor 25 which is a detection unit detecting the state of capacitor C2. Control device 30 of boost converter 12 reduces output voltage instruction value Vdc_com of boost converter 12 at the reducing rate in accordance with the output of temperature sensor 25, as shown in FIG. 8.

This allows for optimization in such a way that an overvoltage of motor voltage Vm and an overcurrent of the boost converter are prevented.

Furthermore, motor drive device 100 is incorporated in a hybrid vehicle.

Figure 9:
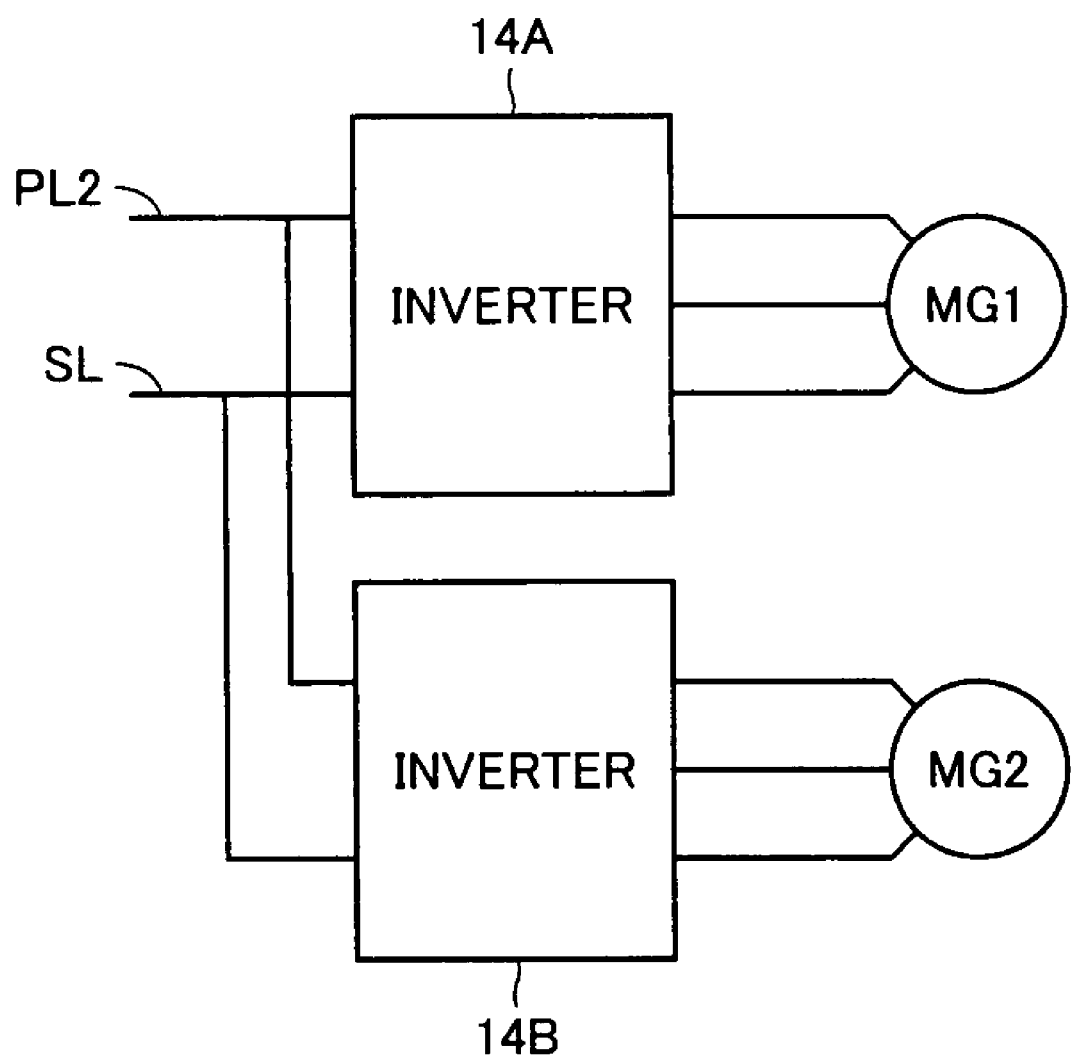
FIG. 9 is a diagram for illustrating application to a hybrid vehicle.

FIG. 9 is a diagram for illustrating application to a hybrid vehicle. In this case, AC motor M1 shown in FIG. 1 includes two motor generators MG1 and MG2, and inverter 14 includes two inverters. That is, as shown in FIG. 9, two inverters 14A and 14B are provided for two motor generators MG1 and MG2, respectively. Two inverters 14A and 14B are connected in parallel to power supply line PL2 and ground line SL connected to respective ends of capacitor C2.

Motor generator MG1 is coupled to the engine via a power split mechanism (not shown), and motor generator MG2 is coupled to the driving wheel via the power split mechanism.

Inverter 14A converts the DC voltage from boost converter 12 into an AC voltage to drive motor generator MG1, and converts the AC voltage generated by motor generator MG1 by means of the rotation power of the engine into a DC voltage to supply it to boost converter 12.

Inverter 14B converts the DC voltage from boost converter 12 into an AC voltage to drive motor generator MG2, and converts the AC voltage generated by motor generator MG2 by means of the rotation power of the driving wheel into a DC voltage to supply it to boost converter 12.

In the case where the wheel is changed from the slipping state to the gripping state, the amount of electric power generated by motor generator MG1 which is increased in the slipping state may exceed the amount of electric power consumed in motor generator MG2 in the gripping state, which poses a problem.

In this case, the change of the rotation speed of MG2 or the wheel is detected to reduce the target voltage instruction value of the boost converter. This allows an overvoltage of the inverter voltage to be prevented.

Accordingly, the present invention has an effect especially on the feedback control of the boost converter incorporated in a hybrid vehicle.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control device of a boost converter used in an electric motor drive system,
    said boost converter boosting a DC voltage of a DC power supply, and
    said electric motor drive system including
    an inverter converting an output voltage of said boost converter into an AC voltage, and
    an electric motor driven by an output voltage of said inverter, wherein
    said control device of said boost converter reduces an output voltage instruction value of said boost converter in the case where a rotation speed of said electric motor decreases and an absolute value of a variation rate of the rotation speed becomes not smaller than a predetermined value.

2. The control device of the boost converter according to claim 1, wherein
    said inverter is controlled in a control mode selected from a plurality of control modes including three modes of a sine wave PWM control mode, an overmodulation PWM control mode and a rectangular wave control mode, and
    said control device of said boost converter reduces the output voltage instruction value of said boost converter only in the case where the control mode of said inverter is said rectangular wave control mode or said overmodulation control mode.

3. The control device of the boost converter according to claim 2, wherein
    said electric motor drive system further includes
    a power supply line transmitting the output voltage of said boost converter to said inverter,
    a capacitor connected to said power supply line, and
    a detection unit detecting the state of said capacitor, and
    said control device of said boost converter reduces the output voltage instruction value of said boost converter at a reducing rate in accordance with an output of said detection unit.

4. The control device of the boost converter according to claim 1, wherein
    said electric motor drive system further includes
    a power supply line transmitting the output voltage of said boost converter to said inverter,
    a capacitor connected to said power supply line, and
    a detection unit detecting the state of said capacitor, and said control device of said boost converter reduces the output voltage instruction value of said boost converter at a reducing rate in accordance with an output of said detection unit.

5. The control device of the boost converter according to claim 1, wherein said electric motor drive system further includes a resolver detecting the rotation speed of said electric motor.

6. A control method of a boost converter used in an electric motor drive system, said boost converter boosting a DC voltage of a DC power supply, and said electric motor drive system including an inverter converting an output voltage of said boost converter into an AC voltage, and an electric motor driven by an output voltage of said inverter, wherein said control method comprises the steps of:

determining whether or not a variation amount of a rotation speed of said electric motor is not more than a predetermined value, and reducing an output voltage instruction value of said boost converter in the case where said rotation speed decreases and an absolute value of a variation rate of the rotation speed becomes not smaller than said predetermined value.

7. The control method of the boost converter according to claim 6, wherein said inverter is controlled in a control mode selected from a plurality of control modes including three modes of a sine wave PWM control mode, an overmodulation PWM control mode and a rectangular wave control mode, and said control method further comprises the step of reducing the output voltage instruction value of said boost converter only in the case where the control mode of said inverter is said rectangular wave control mode or said overmodulation control mode.

8. The control method of the boost converter according to claim 7, wherein said electric motor drive system further includes a power supply line transmitting the output voltage of said boost converter to said inverter, a capacitor connected to said power supply line, and a detection unit detecting the state of said capacitor, and said control method further comprises the step of reducing the output voltage instruction value of said boost converter at a reducing rate in accordance with an output of said detection unit.

9. The control method of the boost converter according to claim 6, wherein said electric motor drive system further includes a power supply line transmitting the output voltage of said boost converter to said inverter, a capacitor connected to said power supply line, and a detection unit detecting the state of said capacitor, and said control method further comprises the step of reducing the output voltage instruction value of said boost converter at a reducing rate in accordance with an output of said detection unit.

10. The control method of the boost converter according to claim 6, wherein said electric motor drive system further includes a resolver detecting the rotation speed of said electric motor.

* * * * *